Oct. 26, 1948.　　　M. RONNING ET AL　　　2,452,153
HARVESTER PLATFORM ADJUSTING MEANS
Filed Dec. 31, 1943　　　　　　　　　　4 Sheets-Sheet 1
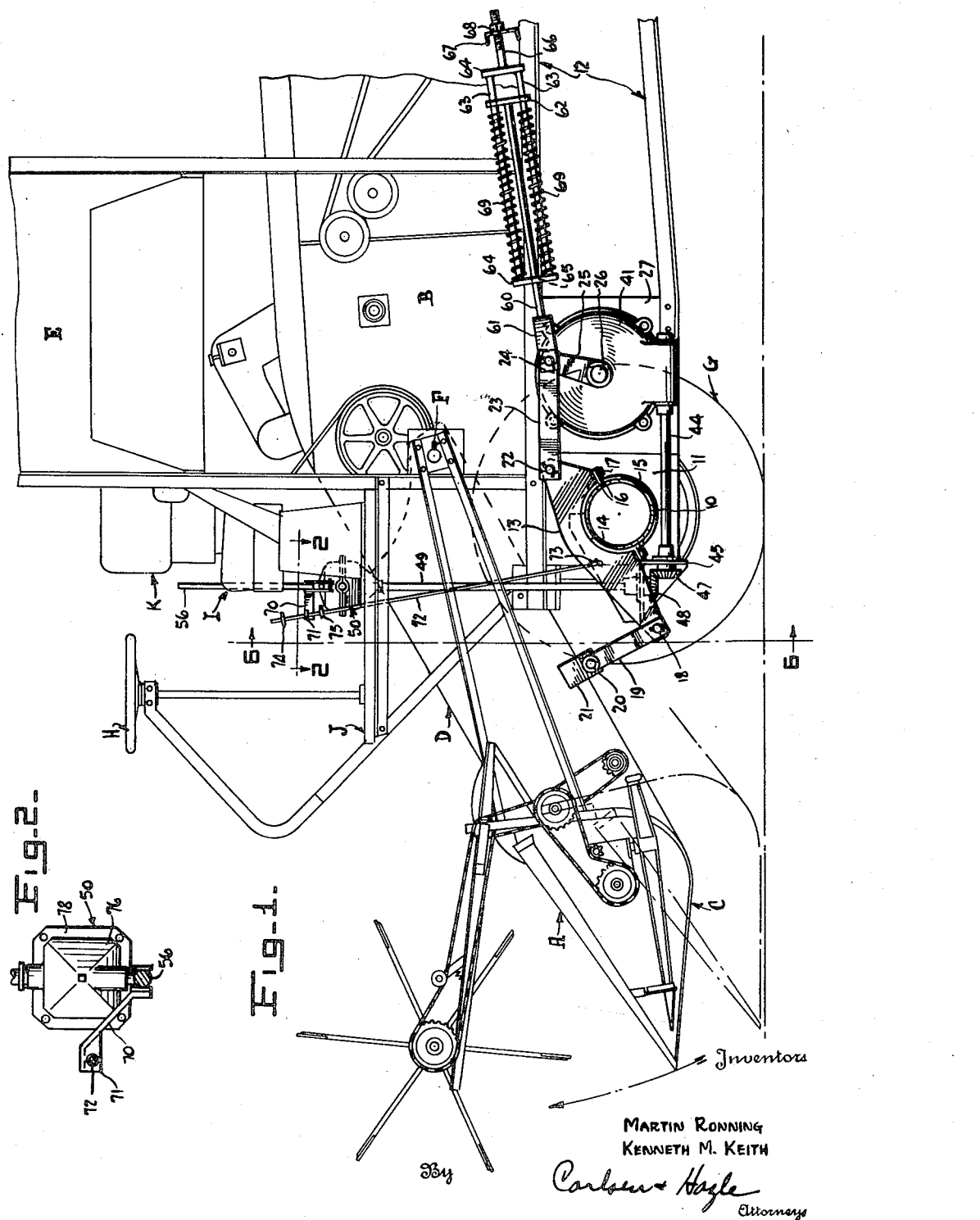
Inventors
MARTIN RONNING
KENNETH M. KEITH

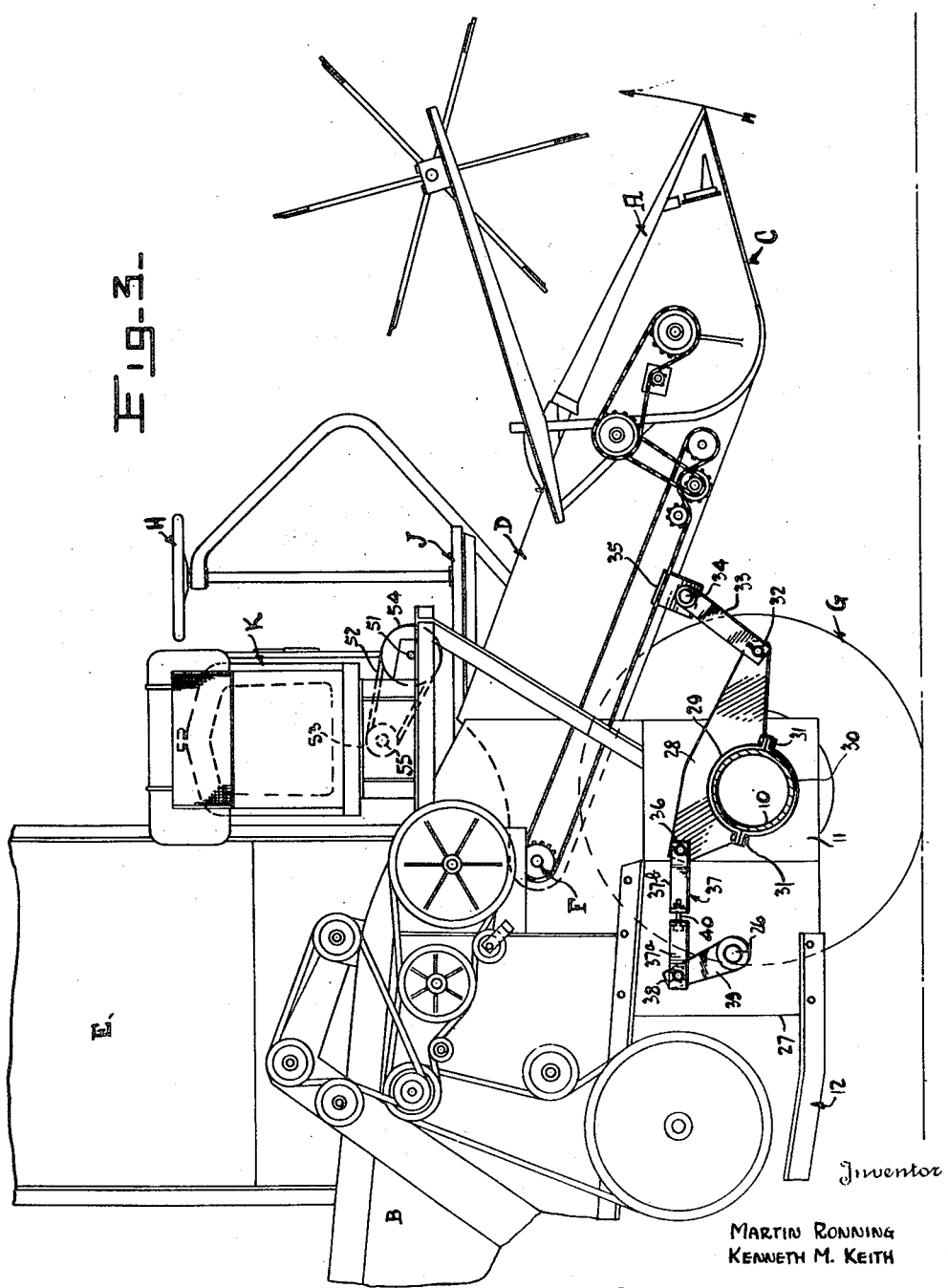

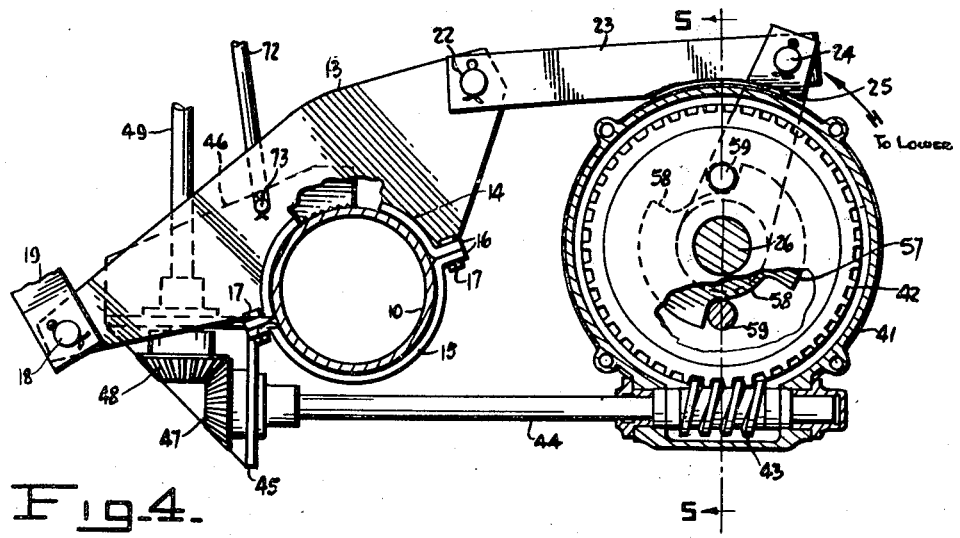
Fig. 4.
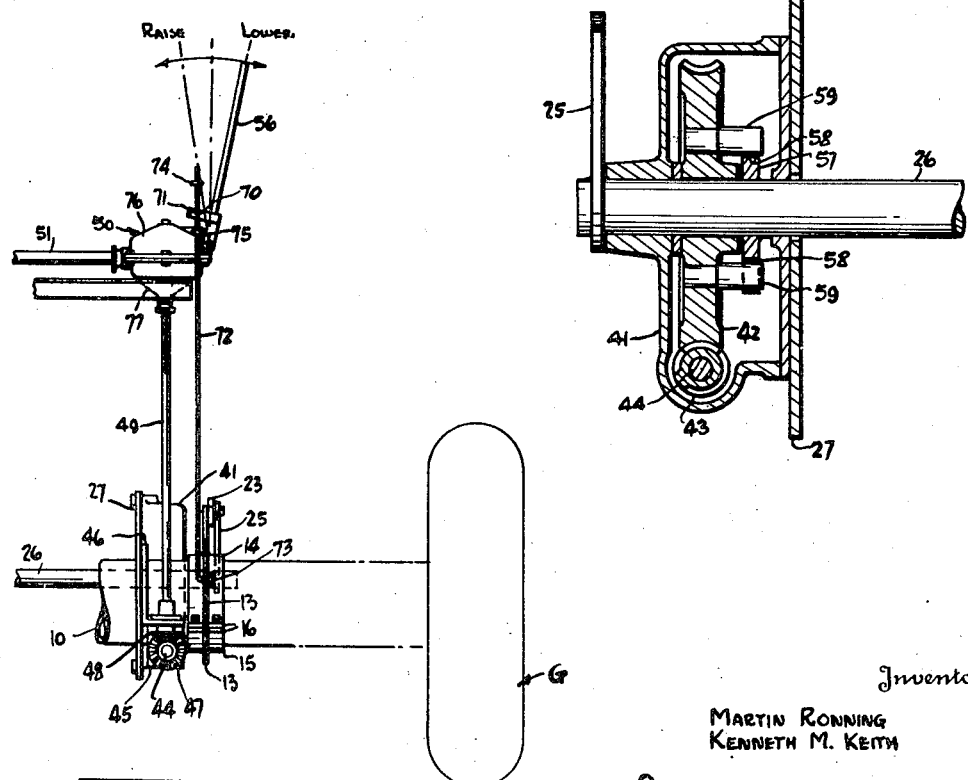
Fig. 5.
Fig. 6.

Oct. 26, 1948.　　　　M. RONNING ET AL　　　　2,452,153
HARVESTER PLATFORM ADJUSTING MEANS
Filed Dec. 31, 1943　　　　　　　　　　　　4 Sheets-Sheet 4
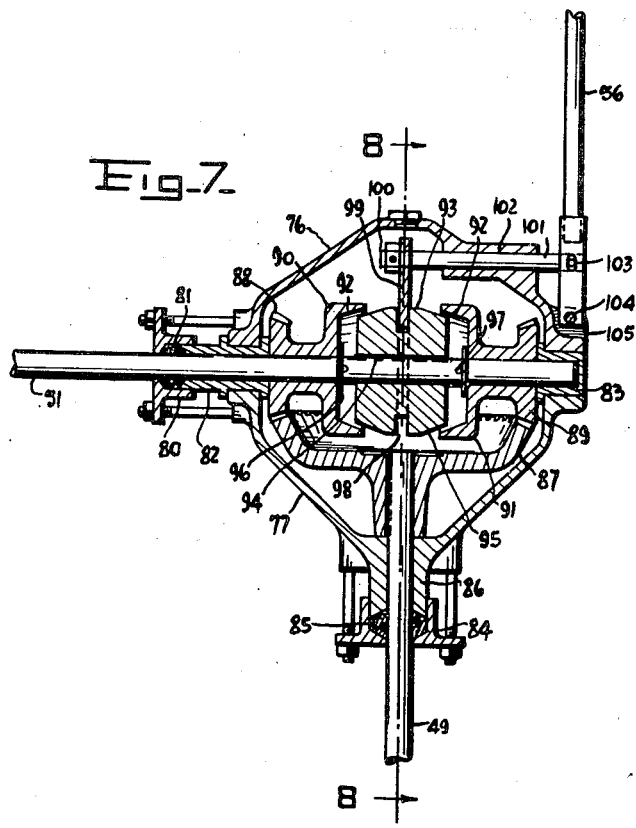
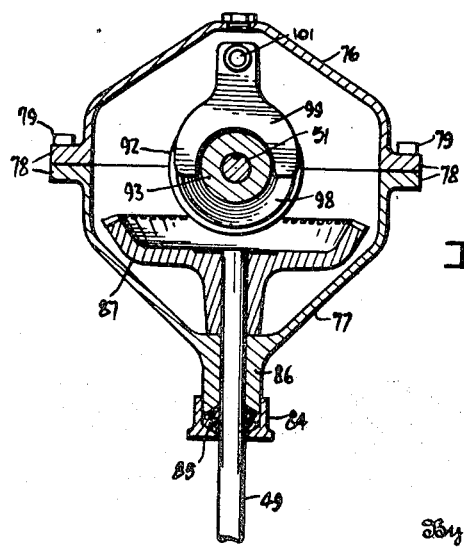
Inventors
MARTIN RONNING
KENNETH M. KEITH
By Carlsen + Hayle
Attorneys Patented Oct. 26, 1948

2,452,153

UNITED STATES PATENT OFFICE 2,452,153

HARVESTER PLATFORM ADJUSTING MEANS

Martin Ronning, St. Louis Park, and Kenneth M. Keith, Minneapolis, Minn., assignors to Minneapolis-Moline Power Implement Company, Minneapolis, Minn., a corporation of Delaware Application December 31, 1943, Serial No. 516,564

8 Claims. (Cl. 56—208)

This invention relates generally to combines, of the harvester-thresher type, and more particularly to a mechanism for lifting the harvester portion of the machine to vary the height of the cut taken thereby.

In the usual machine of this kind the harvester is forwardly located and includes a wide, transversely extending cutter structure which cuts the crop and delivers it to a conveyor leading rearwardly to the threshing elements. The harvester and its rearwardly feeding conveyor are arranged for up and down adjustment about a rearwardly located transverse axis so that the cutter structure may be raised and lowered with respect to the ground for varying the height of the cut. The swinging structure is necessarily quite heavy and requires power lift operation for practical adjustment, this power being available and provided in some manner by a connection to the power plant driving the harvesting, conveying and threshing mechanisms of the machine.

It is the primary object of our present invention to provide power lift mechanism for this purpose by which relatively precise adjustments of the height of the cutter structure may be made and conveniently controlled at the will of the operator. Another object is to provide a mechanism of this kind provided with positively operating means for limiting both the upward and downward adjustments so that the harvester may not be either raised or lowered to positions which would result in damage to the operating links and other parts, or which would cause the cutter structure to dig into the ground. A further object is to provide in connection with lift mechanism of this nature spring suspension means such that the harvester will have a floating effect to ride over obstructions which it might contact in the field, said spring means being further arranged to assist in lifting the structure. Still another object is to provide, in connection and cooperation with the lift mechanism, a reversing clutch unit for taking power from the engine or power plant which is of the friction drive type such that the drive may slip should the lift mechanism or harvester jam or otherwise come to a halt during adjustment, and which furthermore is arranged to automatically disengage itself when its control member is released thus greatly facilitating precise adjustments.

These and other more detailed and specific objects will be disclosed in the course of the following specification, reference being had to the accompanying drawings, in which—

Fig. 1 is a side elevation of the forward portion of a combine equipped with our improved lift mechanism, the near ground wheel being removed and the axle shown in cross section, the harvester element being shown in broken lines in a lowered position and in full lines as in a partially raised position.

Fig. 2 is an enlarged fragmentary section view along the line 2—2 in Fig. 1.

Fig. 3 is a view similar to Fig. 1 but viewing the machine from the opposite side and showing the harvester element further elevated.

Fig. 4 is an enlarged fragmentary side elevation of a part of the lift mechanism as seen in Fig. 1, the housing for the worm gear drive being shown in section and a part of the gear itself being broken out to better disclose the construction.

Fig. 5 is a vertical cross section along the line 5—5 in Fig. 4.

Fig. 6 is a fragmentary front elevation taken along the line 6—6 in Fig. 1.

Fig. 7 is a vertical sectional view through the reversing drive unit forming a part of our invention.

Fig. 8 is a sectional view along the line 8—8 in Fig. 7.

Referring now more particularly and by reference characters to the drawings, A designates generally the harvester, or header element or part of the combine and B the threshing element or part thereof. The element A in usual fashion includes a wide cutter structure which cuts the crop and delivers it to a platform C whereon it is conveyed crosswise toward the forward end of a conveyor housing D in which is located a conveyor (not shown) which carries the crop rearwardly and upwardly into the threshing device B. The grain is separated in the latter device from the straw and chaff, the clean grain being delivered to a grain tank E and the straw and chaff being dropped back to the field at the rear of the machine. To permit adjustment of the height of the cut the rear end of the housing D is pivoted to the thresher housing about a pivot axis F so that the housing D and harvester element A may oscillate in an upright longitudinal plane.

The machine is supported upon wide spread forward traction wheels G and by a rearwardly located steering truck (not shown) which is angled for steering purposes under control of a steering wheel H located convenient to the operator's station I upon a platform J supported alongside the machine in an elevated position.

Power both for running the traction wheels G to propel the machine over the field and for operating the various harvesting, conveying and threshing mechanisms is provided by a power plant or engine K which is supported above the forward part of the thresher housing inwardly of the platform J.

The traction wheels G turn at the ends of a tubular fixed axle 10 which is carried in bracket plates 11 secured to the main frame 12 of the combine. At one side of the combine, the left side looking forwardly as here shown, a rocker arm or member 13 is provided and has a semicircular fastening band 14 which cooperates with a similar band 15 to form a ring to encircle the axle 10. The respective bands 14 and 15 have outwardly turned ears 16 which receive bolts 17 by which the ring is fastened together, the fit being such that the rocker arm 13 may oscillate about the center of the axle as an axis, and in a plane paralleling the movement of the harvester A and housing D.

An end of the rocker arm 13 extends generally forwardly of the axle 10 and pivotally connected to this end by means of a pin 18 is the lower end of a lift link or bar 19, the other end of which is pivoted by a pin 20 to a bracket 21 affixed to the side of the housing D.

The rocker arm 13 further has a generally rearwardly and upwardly disposed end to which is pivoted by a pin 22 a link 23 extending rearwardly and pivoted at its other end by a pin 24 to a lever or arm 25. The lever 25 is disposed rearwardly of the axle 10 and is secured rigidly to a shaft 26 journaled transversely of the machine through plates 27 secured to the frame 12.

At the other side of the machine the axle 10 supports another rocker arm 28 having a semicircular band 29 mating with another similar band 30 and secured thereto by bolts 31 to form a ring rotatably fitting the axle. The forwardly disposed end of this rocker arm 28 is pivotally connected by a pin 32 to one end of a lifting link 33 having its other end pivoted by a pin 34 to a bracket 35 on the housing D. The rearwardly and upwardly disposed end of the rocker arm 28 is pivoted by a pin 36 to the forward end of a link 37 the rear end of which is pivoted by a pin 38 to a lever 39 secured to the end of the shaft 26.

The positions of the various pivots and effective leverages of the rocker arms 13 and 28, links 19 and 33, links 23 and 37 and levers 25 and 39 of the respective assemblies at each side of the machine are equal and it will be evident that the oscillation of the shaft 26 by swinging the levers 25 and 39 and the rocker arms 13 and 28 will raise and lower the harvester A as required. Thus forward movements of the levers 25 and 39 will lower the harvester, by rocking the forward ends of the rocker arms downwardly, and vice versa. The shaft 26 must accordingly be locked in any adjusted position to maintain the harvester at the required elevation.

Attention is called to the link 37 at the right side of the machine. This link is made of two sections 37ᵃ and 37ᵇ which are disposed end to end and at adjacent ends are connected by a bolt 40. Adjustment of this bolt thus permits the overall length of the link 37 to be adjusted. In this manner this side of the harvester may be raised or lowered slightly with respect to the other side to properly level the cutter structure with respect to the ground as will be understood.

The shaft 26 is power adjusted and rigidly locked in adjusted positions by the structure now to be described. At one end the shaft extends through a worm gear housing 41 secured to the plate 27 and here shown as located at the left side of the machine. Within the housing 41 a worm gear 42 is journaled freely on the shaft 26 and meshes with a worm 43 from which a drive shaft 44 extends forwardly beneath the axle 10.

At its forward end the shaft 44 is journaled in a bracket 45 secured by a gusset plate 46 to the axle 10, and a beveled gear 47 is secured to the shaft in mesh with another beveled gear 48 mounted at the end of an upright shaft 49. A reversible drive unit designated generally at 50 is supported inwardly of the platform J at about the level thereof and the upper end of the shaft 49 is driven by this unit. A countershaft 51 drives the unit 50 and is in turn (Fig. 3) driven by a belt 52 and pulleys 53—54 from a forward end of the power plant crankshaft 55. The countershaft 51 extends forwardly along the power plant K.

The drive unit 50, the construction of which will be detailed later herein, is controlled by a hand lever 56 in such manner that when the lever is pushed inwardly with respect to the platform or the operator at his station I, the countershaft 51 will rotate the shaft 49 in one direction, whereas outward movement of the hand lever will cause the direction of rotation of the shaft 49 to be reversed. In an intermediate, or normal neutral, position of the hand lever 56 the shaft 49 is not connected to the countershaft and remains stationary. The reversible rotational movements of the shaft 49 will of course be transmitted to the shaft 44 through the gears 47 and 48 and will rotate the worm 43 and worm gear 42 in opposite directions.

A drive member or disk 57 (Figs. 4 and 5) is secured to the shaft 26 within the housing 41 and alongside the worm gear 42. Said drive member has a pair of spaced notches or recesses 58 in its outer peripheral surface and playing in said notches are drive pins 59 which are secured to the worm gear 42 and extend across the width of the drive member. Obviously as the worm gear rotates in one direction the pins 59 will move the length of the notches 58 until the pins engage the ends thereof whereupon the rotation of the worm gear will be transmitted through the drive member 57 to the shaft 26. As the direction of rotation is reversed the pins 57 will travel the length of the notches in the opposite direction until they again pick up and carry the drive member along. There is thus provided limited freedom for relative oscillating movements between the worm gear 42 and the shaft 26.

In operation, as thus far described, it will be evident that the weight of the harvester A will normally pull forwardly on the levers 25 and 39 rotating the shaft 26 in a counterclockwise direction as viewed in Figs. 1 and 4. The drive member 57 will thus rest with the ends of its notches 58 against the pins 59 as seen in Fig. 4 and the locked condition of the worm gear 42, by the worm 43, will support the harvester against downward displacement. Now to lower the harvester the operator may pull outward upon the hand lever 56, as indicated in Fig. 6, setting the shafts 49 and 44 in rotation by action of the power plant K and rotating the worm gear 42 counterclockwise as seen in Fig. 4. The resulting travel of the drive pins 59 then permits the drive member 57 to turn or follow along, and the shaft 26 rotates and the levers 25 and 39 swing forwardly, lowering the harvester. This action continues as long as the hand lever 56 is held in this engaged position. Attention is called, however, to the action should the operator leave the drive engaged until the harvester or some part thereof strikes the ground as sometimes occurs. Instead of the shock being transmitted to the various operating parts, the worm gear 42 simply turns free with respect to the drive member 57, as the pins 59 now move away from the ends of the notches 58, so that the various drive gears and the shafts 44 and 49 will continue to run. This action might continue until the pins 59 reached the other ends of the notches 58 to reestablish the drive but the condition will be noted before that time and rectified by the operator disengaging the drive unit.

To raise the harvester the hand lever 56 may be pushed inward to reverse the direction of rotation of the worm gear 42. The drive pins 59 then directly transmit the clockwise rotation (as viewed in Figs. 1 and 4) to the ends of the notches 58 and turn the shaft 26 in the proper direction to rock the levers 25 and 39 rearwardly.

The "floating" effect offered by the freedom for relative movements between the worm gear 42 and the shaft 26 is taken advantage of further by the provision of rearward spring tension upon the lever 25 as will now be described. A link rod 60 is provided having a bifurcated forward end 61 which is pivoted upon the pin 24 on the lever 26 and the rearwardly extending end of this link rod is provided with a cross head 62 the ends of which are apertured to slide freely on parallel guide rods 63. Said rods 63 are mounted rigidly at their ends upon cross bars 64 and are spaced to opposite sides of the link rod 60, the one of said cross bars having a central opening 65 to slidably pass said link rod. A threaded pin 66 extends rearwardly from the rear cross bar 64 and passes through a bracket or beam 67 secured to the frame 12 at an appropriate point, said pin being provided rearwardly of the bracket 67 with a nut 68. Expansion coil springs 69 are placed on the guide rods 63 between the cross head 62 and the forward cross bar 64.

In an elevated position of the harvester A the cross head 62 stands rearwardly of the springs 69, as seen in Fig. 1, but as the harvester is lowered the forward movement of the link rod 60 causes the cross head 62 to move forwardly along the guide rods 63, coming into contact with and compressing the springs 69. The springs thus exert a yielding force tending to raise the harvester, the extent of this force increasing as the harvester approaches the ground. The springs thus exert a counter-balancing action assisting in lifting the harvester. Also the spring tension affords a floating effect for the header such that it may move upwardly to clear slight obstructions, as should be clearly apparent.

As a further protection against either raising or lowering the harvester to points which might damage the parts we provide an automatic disengaging means for the power drive unit 50. An arm 70 is secured to the hand lever 56 and extends angularly therefrom, the free end of the arm being provided with an apertured lug 71 through which is slidably passed the upper end portion of a release rod 72. The lower end of the rod 72 is hooked at 73 to the rocker arm 13 forwardly of the axle 10 so that the rod will be pulled downwardly as the harvester is lowered and will be raised as the harvester is elevated. Above and below the lug 71 on the arm 70 the rod 72 is provided with stop collars 74 and 75 rigidly secured in place in proper positions.

In action, as the harvester reaches the lowest level desired the upper stop collar 74 will contact the lug 71 pulling downward on the arm 70 and swinging the hand lever 56 toward neutral position to thus automatically disengage the power drive. As the harvester approaches the highest required level the upward movement of the rod 72 will cause the lower stop collar 75 to engage the lug and oppositely swing the hand lever 56 to return it to neutral position and again disengage the drive. Between these extremes of the harvester adjustment the rod 72 will slide freely through the lug 71 and will in no way interfere with the manipulation of the hand lever 56. The drive disengaging action is positive, however, when the harvester reaches the extremes of its adjustment and will overcome any manual pressure which might be exerted on the hand lever.

The reversible drive unit 50 for best operation in connection with our lift mechanism should have certain characteristics such as a self-disengaging action and a frictional or non-positive drive permitting a nicety of engagement and disengagement for driving the lift mechanism in either direction. A unit having these desirable features is disclosed in Figs. 7 and 8 and comprises a housing having upper and lower sections 76 and 77 joined along a meeting line by flanges 78 and bolts 79 in a conventional manner. The drive shaft 51 from the power plant K is journaled in the housing in a transverse direction, entering through a packing gland 80 and packing 81 into a bearing 82 at the inner side of the housing and ending in a bearing cap 83 at the other side. The shaft 49 leading to the lift mechanism enters the housing through the bottom section 77 at right angles to the shaft 51 and turns in a packing gland 84, packing 85 and a bearing 86.

A beveled gear 87 is secured to the upper end of the shaft 49 within the drive unit housing and meshes continually with a pair of spaced beveled gears 88—89, one of said gears being located adjacent each end of the shaft 51 within the housing and each gear 88—89 turning freely with respect to the shaft. Formed integrally with the gears 88—89 are clutch drums 90—91 each of which has an annular tapered face 92 on its inner side. A clutch member or cone member 93 is keyed at 94 on the shaft 51 between the drums 90—91 and has angular peripheral surfaces 95 at opposite ends adapted to frictionally engage the faces 92. The gears 88—89 and clutch drums 90—91 are held against endwise displacement on the shaft 51 by collars 96 and pins 97 and are so spaced that in its normal, neutral position (Fig. 7) the clutch member 93 will clear both of the drums 90 and 91.

The clutch member 93 has a central peripheral groove 98 and a fork 99 loosely engages this groove, the upper end of the fork being secured at 100 to a shifter rod 101 slidably mounted through a bearing 102 in the upper housing section 76 above the shaft 57 for movement parallel therewith. Outside of the housing the shifter rod 101 is pivotally connected at 103 to the hand lever 56 which itself is pivoted at 104 to a lug 105 on the housing so that it may swing as previously described and will reciprocate the shifter rod 101 endwise in so doing.

It will be readily seen that the endwise movement of the shifter rod 101 will cause the fork 99 to shift the clutch member 93 in opposite directions along the shaft 51. Thus by proper movements of the hand lever 56 the clutch member 93 may be brought into engagement with either clutch drum 90 or 91, causing a frictional driving contact to be established between the respective clutch faces 92 and 95. The shaft 51 will thus drive the shaft 49 in either direction according to the clutch drum thus engaged.

The clutch member 93 will normally seek its center position, that is, when the hand lever 56 is moved in either direction it must be held as long as a driving connection is wanted and when released the drive will automatically disengage itself. The relative strength of the driving connection depends upon the pressure exerted on the hand lever and can at any time slip should any part of the lift mechanism become jammed for any cause. It is found in practice that great nicety of adjustment of the harvester is possible by virtue of this drive unit, it being possible merely to "pat" the hand lever 56 in either direction and bring about very minor adjustments.

It is understood that suitable modifications may be made in the structure as disclosed, provided such modifications come within the spirit and scope of the appended claims.

Having now therefore fully illustrated and described our invention, what we claim to be new and desire to protect by Letters Patent is:

1. In a combine having a harvester part mounted for up and down adjustments, means for raising and lowering the harvester part comprising an arcuately movable member mounted on the combine and connected by a link to the harvester, a rotary operating member for oppositely adjusting said movable member to thereby raise and lower the harvester part, and means forming a lost motion connection between the said members and permitting limited relative movement therebetween in a direction such that the harvester part may move upwardly independently of the rotated position of said rotary operating member.

2. In a combine having a harvester part mounted for up and down adjustments, lift mechanism for raising and lowering said harvester part comprising, a lever member mounted on the combine for opposite swinging movement, link means connecting the lever member to the harvester part whereby said opposite swinging movements of the lever member will raise and lower the harvester part, rotary drive means for actuating the lever member, means for connecting the lever member and drive means to normally cause opposite adjustment of said means to oppositely swing the lever member, said connecting means having a lost motion permitting the drive means to operate through a limited range independently of the lever member when the downward progress of the harvester part is halted while the drive means is in operation to lower the harvester part.

3. In a combine having a harvester part mounted for up and down adjustments, lift mechanism for raising and lowering said harvester part comprising, a lever member mounted for opposite swinging movements, means connecting the lever member to the harvester part whereby said opposite swinging movements of the lever member will raise and lower the harvester part, a drive member connected to the lever member, a rotatable member, means for operating the rotatable member, the said drive member having pairs of spaced stops, and pins on the rotatable member adapted to move between and engage said stops whereby opposite rotation of the member will oppositely adjust the drive member and lever member, the said stops of each pair being spaced sufficiently to permit limited relative movement between the rotatable member and the drive member.

4. In a harvester having a cutter structure mounted for vertical adjustment, mechanism for raising and lowering said structure comprising a power actuated rotary member adapted to be selectively rotated in opposite directions, an oscillatable element mounted coaxially with the rotary member and connected with the cutter structure to vertically adjust the same, and a lost motion connection between the said member and element through which the rotary member may actuate the oscillatable element to lift the cutter structure but which will permit the cutter structure to move relatively upwardly without corresponding movement of the rotary member.

5. Mechanism for vertically adjusting the cutter mechanism of a harvester comprising a rotary member mounted on the harvester for operation in either direction, an oscillatable member mounted coaxially with the rotary member and connected with the cutter mechanism, and a lost motion connection between the rotary and oscillatable members whereby rotation of the rotary member in one direction will actuate the oscillatable member while permitting the members to move in relatively different directions.

6. Mechanism for vertically adjusting the cutter mechanism of a harvester comprising a rotary member mounted on the harvester for operation in either direction, an oscillatable member mounted coaxially with the rotary member and connected with the cutter mechanism, and a pin and recess drive connection between the members operative to permit limited relative movement between the members about their common axis.

7. In a combine having a frame and a vertically adjustable harvester unit carried thereby, a power driven shaft mounted in the frame for rotation in either direction, a pair of spaced stops carried by the shaft, an arm fulcrumed coaxially with the shaft and having a pin movable between and against said stops, and a lift connection between the arm and said harvester unit.

8. In a combine having a frame and a vertically adjustable harvester unit carried thereby, a power driven shaft mounted in the frame for rotation in either direction, a pair of spaced stops carried by the shaft, an arm fulcrumed coaxially with the shaft and having a pin movable between and against said stops, and a lift connection between the arm and said harvester unit, said lift connection including a lever fulcrumed on the frame.

MARTIN RONNING.
KENNETH M. KEITH.

REFERENCES CITED

The following references are of record in the file of this patent:

UNITED STATES PATENTS

| Number | Name | Date |
|---|---|---|
| Re. 16,378 | MacGregor | July 6, 1926 |
| 992,347 | Fahr | May 16, 1911 |
| 1,728,150 | Christiansen | Sept. 10, 1929 |
| 1,933,535 | Apel | Nov. 7, 1933 |
| 1,934,198 | Mainland | Nov. 7, 1933 |
| 1,948,895 | Welty | Feb. 27, 1934 |
| 1,964,491 | Welty | June 26, 1934 |
| 2,170,573 | Pierson | Aug. 22, 1939 |